United States Patent
Nakao

(10) Patent No.: US 6,625,332 B1
(45) Date of Patent: Sep. 23, 2003

(54) COMPUTER-IMPLEMENTED IMAGE REGISTRATION

(75) Inventor: Toshiyasu Nakao, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/412,339

(22) Filed: Oct. 5, 1999

(51) Int. Cl.[7] .................................................. G06K 9/32
(52) U.S. Cl. ...................................... 382/294; 382/291
(58) Field of Search ................................ 382/284, 294, 382/291, 154, 151; 348/580; 708/442; 345/433, 115, 435; 358/450

(56) References Cited

U.S. PATENT DOCUMENTS

| | | | |
|---|---|---|---|
| 5,909,521 A | | 6/1999 | Nakao et al. .................. 382/312 |
| 5,987,164 A | * | 11/1999 | Szeliski et al. ............... 382/154 |
| 6,246,413 B1 | * | 6/2001 | Teo .............................. 345/419 |
| 6,434,265 B1 | * | 8/2002 | Xiong et al. ................. 382/154 |

FOREIGN PATENT DOCUMENTS

| | | |
|---|---|---|
| JP | 7-264483 | 10/1995 |
| JP | 8-145628 | 6/1996 |
| JP | 9-218941 | 8/1997 |
| JP | 10-49681 | 2/1998 |

OTHER PUBLICATIONS

T. Yoshida et al., "A Reliability Metric for Motion Vectors in Moving Pictures and Its Application", EIC D–II, vol. J80, No. 5; 5/97, pp. 1192–1201.

L.G. Brown, "A Survey of Image Registration Techniques", ACM Computing Surveys, vol. 24, No. 4, 12/92, pp. 325–376.

Image Process Handbook, published by Shokodo, Jun3 8, 1987, pp. 303–305.

Image Analysis Handbook, published by Publish Section of Univ. of Tokyo, Jan. 17, 1991, pp. 707–746.

* cited by examiner

*Primary Examiner*—Yon J. Couso
(74) *Attorney, Agent, or Firm*—Foley & Lardner

(57) ABSTRACT

In order to perform image registration of first and second images using block matching wherein the first image is divided into a plurality of blocks, the plurality of blocks are classified into a plurality of block groups, using block matching results, such that the blocks classified into the same block group are considered to produce similar position correcting parameters. A plurality of position correcting parameters is determined with each of the plurality of block groups specified above. Thereafter, most appropriate position correcting parameters are determined, among the position correction parameters determined by referring to said first and second images.

5 Claims, 8 Drawing Sheets

COMPUTER-IMPLEMENTED IMAGE REGISTRATION

BACKGROUND OF THE INVENTION

1. Field of the Invention

The present invention relates generally to computer-implemented image registration, and more specifically to the image registration wherein the positional relationships between the images are correctly and rapidly determined in order to precisely merge the images into a single synthesized one.

2. Description of the Related Art

Pictures are typically acquired into a computer system using CCD (charge coupled device) cameras, scanners, etc. However, if a picture is too wide to take the entire picture at a time, due to a limited view angle of the camera (for example), it is necessary to separately take a plurality of partial pictures. Thereafter, the partial pictures are acquired into the computer wherein the picture images are merged into a single synthesized image. In order to automatically merge the partial images using a computer system, a variety of image registration techniques have been proposed.

The known registration techniques typically determine the parameters for image matching, using indexes such as residuals or cross-correlation coefficients, by way of sequential search within a parameter space formed by all parameter candidates. Some examples of such techniques are disclosed in a pager entitled "A Survey of Image Registration Techniques" by Lisa G. Brown, ACM Computing Surveys, Vol. 24, No. 4, December 1992 (Related Art 1). However, this related art suffers from the drawbacks that the number of calculations exponentially increases with increase in the number of parameters included.

One known approach to reducing the number of calculations is disclosed in Japanese Laid-open Patent Application No. 7-264483 (Related Art 2) wherein techniques for matching X-ray images are described. According to this related art, a feature point is extracted from the image, after which the image portion in close vicinity of the feature point is divided into blocks. Subsequently, each block is processed to determine only the amount of parallel movement (viz., block matching). The results thus obtained are combined using least squares method, after which various parameters are determined which are related to the amount of parallel movement, rotation, magnification, and reduction. According to this related art, the parameter space is formed only by the amount of parallel movement and thus, it is able to prevent the exponential increase in the number of calculations.

Further, Japanese Laid-open Patent Application No. B-145628 (Related Art 3) discloses another technique wherein block matching is applied to a plurality of templates. The matching results are used to determine the parameters indicating the amount of parallel movement rotation, etc. in connection each of the all combinations of blocks. Lastly, the parameter that exhibits the minimum square error is determined as the result of the image registration.

However, according to the conventional registration using the blocking matching, such as disclosed in Related Art 2, the parameter space is composed only of the amount of parallel movements and thus, the exponential increase in the number of calculations is able to be prevented. However, such a known technique has encountered the difficulty that the parameters obtained are liable to be adversely affected by the blocks that provide the incorrect amount of parallel movement, and accordingly, the parameters are no longer determined precisely.

On the other hand, Related Art 3 is able to solve the above-mentioned problem inherent in Related Art 2 by way of selecting the parameters, which minimize the square error, among the parameters ascertained with every block combination. However, according to Related Art 3, the parameters which are deemed appropriate are determined solely on the basis of the block matching results. Accordingly, if some of the blocks causes identical or similar errors in determining the amount of parallel movement, the known technique disclosed in Related Art 3 is no longer expected to provide reliable results.

SUMMARY OF THE INVENTION

It is therefore an object of the present invention to eliminate the problems inherent in the above-mentioned conventional image registration.

Another object of the present invention is to provide the image registration techniques wherein the positional relationships between images are precisely and rapidly determined in order to correctly merge the images into a single synthesized one.

In brief, these objects are achieved by the techniques wherein in order to perform image registration of first and second images using block matching wherein the first image is divided into a plurality of blocks, the plurality of blocks are classified into a plurality of block groups, using block matching results, such that the blocks classified into the same block group are considered to produce similar position correcting parameters. A plurality of position correcting parameters is determined with each of the plurality of block groups specified above. Thereafter, most appropriate position correcting parameters are determined, among the position correction parameters determined by referring to the first and second images.

One aspect of the present invention resides in an apparatus for performing computer implemented image registration of first and second images using block matching wherein the first image is divided into a plurality of blocks, comprising: first means for classifying the plurality of blocks into a plurality of block groups, using block matching results, such that the blocks classified into the same block group are considered to produce similar position correcting parameters; second means for determining a plurality of position correcting parameters with each of the plurality of block groups determined by the first means; and third means for determining most appropriate position correcting parameters, among the plurality of position correction parameters determined by the second means, by referring to the first and second images.

Another aspect of the present invention resides in an apparatus for an apparatus for determining positional relationship between first and second images in order to implement registration of the first and second images, comprising:
a first memory;
a block divider for dividing the first image into a plurality of blocks and determining attribute data of each block which is stored in the first memory; a block selector for determining block characteristic values of each block by referring to the first image and the attribute data stored in the first memory, the block selector selecting, using the block characteristic values, a plurality of blocks each of which is considered that there is little possibility of causing an erroneous result when the block matching is implemented on the block; block matching means for implementing block matching on the blocks selected by the block selector and determining corresponding points of the first and second images, the corresponding points being stored in the first memory; a block classifier for classifying the plurality of blocks into a plurality of block groups, using block matching results, such that the blocks classified into the same block group are considered to produce similar position correcting parameters; a second memory; means for determining position correcting parameters for each of a plurality of block groups, the position correcting parameters being stord in the second memory; and a parameter determiner for determining a position correcting parameter, among the plurality of position correction parameters, determined by the means, for most appropriately matching the first and second images.

Still another aspect of the present invention resides in a method of performing computer-implemented image registration of first and second images using block matching wherein the first image is divided into a plurality of blocks, comprising the steps of: (a) classifying the plurality of blocks into a plurality of block groups, using block matching results, such that the blocks classified into the same block group are considered to produce similar position correcting parameters; (b) determining a plurality of position correcting parameters with each of the plurality of block groups determined by the first means; and (c) determining most appropriate position correcting parameters, among the plurality of position correction parameters determined by the second means, by referring to the first and second images.

Still another aspect of the present invention resides in a method of determining positional relationship between first and second images in order to register the first and second images, comprising the steps of: (a) dividing the first image into a plurality of blocks and determining attribute data of each block which is stored in a first memory; (b) determining block characteristic values of each block by referring to the first image and the attribute data stored in the first memory, and selecting, using the block characteristic values, a plurality of blocks each of which is considered that there is little possibility of causing an erroneous result when the block matching is implemented on the block; (c) implementing block matching on the blocks selected at step (b) and determining corresponding points of the first and second images, the corresponding points being stored in the first memory; (d) classifying the plurality of blocks into a plurality of block groups, using block matching results, such that the blocks classified into the same block group are considered to produce similar position correcting parameters; (e) determining position correcting parameters for each of a plurality of block groups, the position correcting parameters being stored in a second memory; and (f) determining a position correcting parameter, among the plurality of position correction parameters stored in the second memory, for most appropriately matching the first and second image.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

A preferred embodiment of the present invention will be described with reference to the accompanying drawings.

Figure 1:
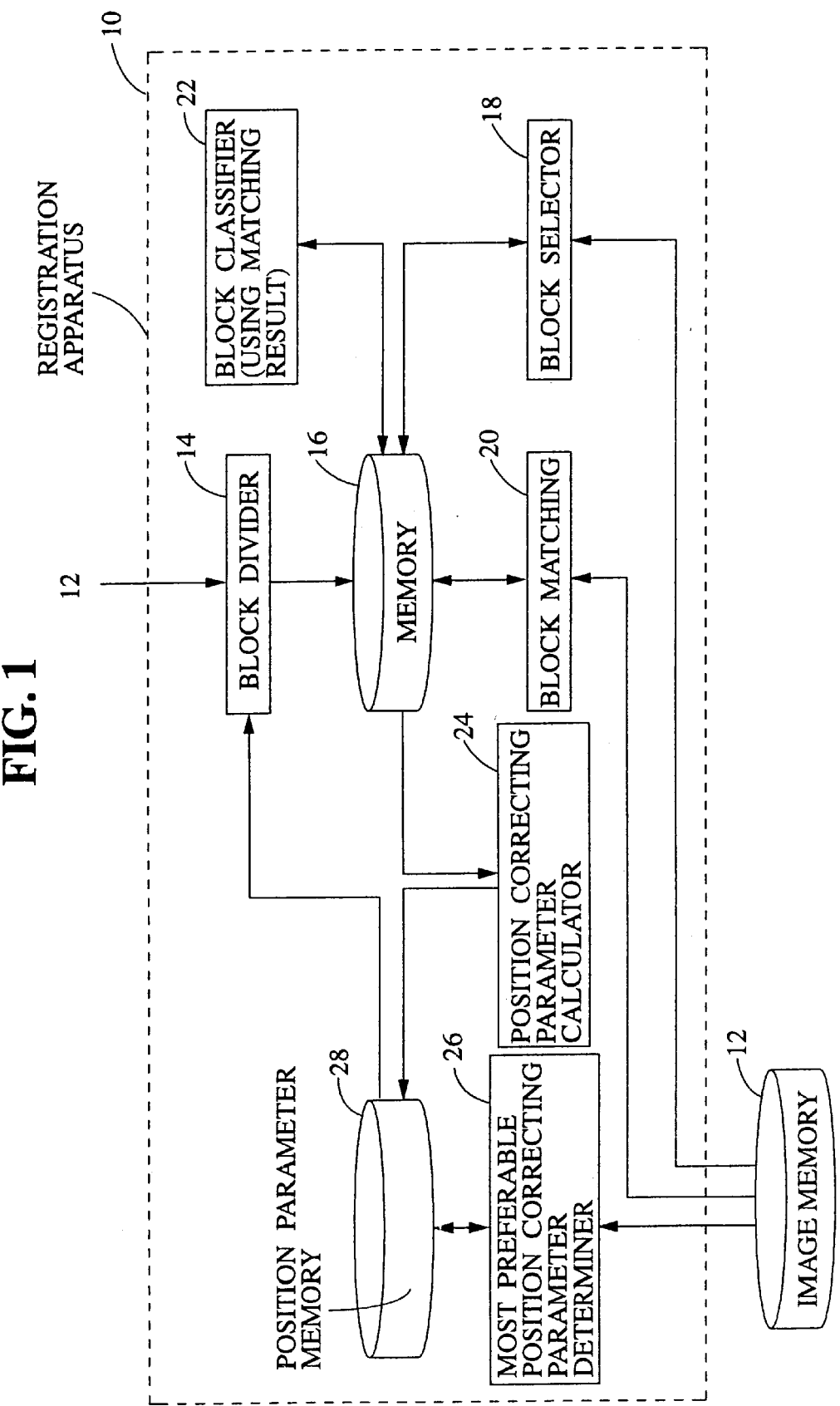
FIG. 1 is a diagram schematically showing an overall arrangement of an image registration apparatus according to a preferred embodiment of the present invention.

FIG. 1 is a block diagram showing an image registration apparatus 10, which is comprised of a plurality of function blocks and is operationally coupled to an image memory 12. The memory 12 has previously stored image data such as a base (reference) image, a processing (object) image to be registered to the base image, etc. A block divider 14 is supplied with the base image and divides the same into a plurality of blocks, determines block attributes specifying the position of each block and also determines position parameter candidates indicating an area to which the image registration is applied. The block attributes and the position parameter candidates thus obtained are stored in a memory 16.

A block selector 18 is provided for determining a block characteristic value for each block using the block attributes stored in the memory 16 and the image data stored in the memory 12. Thereafter, the block selector 18 selects, based on the block characteristic values thus obtained, a plurality of blocks each of which has been determined such that the possibility of inducing the erroneous result is low when the block matching is implemented on the block.

A block matching portion (unit) 20 implements the block matching, which involves translations (viz., image parallel movement or shift), on each of the blocks selected by the block selector 18 by referring to the base and processing images stored in the memory 12. The block matching results are stored in the memory 16.

A block classifier (or matching result classifier) 22 is supplied with the block matching results of the blocks selected by the block selector 18, classifying the registration results considering whether or not each of the results is based on the identical position correcting (compensating) parameters, and storing the classifying results in the memory 16, in other words, the block classifier 22 is to classify the blocks into a plurality of groups by examining whether or not the block match results in connection with each block group are caused by the identical position correcting parameters.

A position correcting parameter calculator 24 calculates the position correcting parameters, which includes the amount of rotation, for each of the groups (sets) classified by the block classifier 22. On the other hand, a most preferable (suitable) position correcting parameter determiner 26 determines the most preferable position correcting parameters, with reference to the base and processing images, among the position correcting parameters, which includes the amount of the rotation, produced from the calculator 24. The position correcting parameters indicates the transformation form the initial position of the processing image.

A position parameter memory 28 is provided to store the position correcting parameter candidates of the processing image, and the position correcting parameters determined with each block group (viz., each block matching result group).

The image registration apparatus 10 will further be described with reference to the accompanying drawings.

Figure 2:
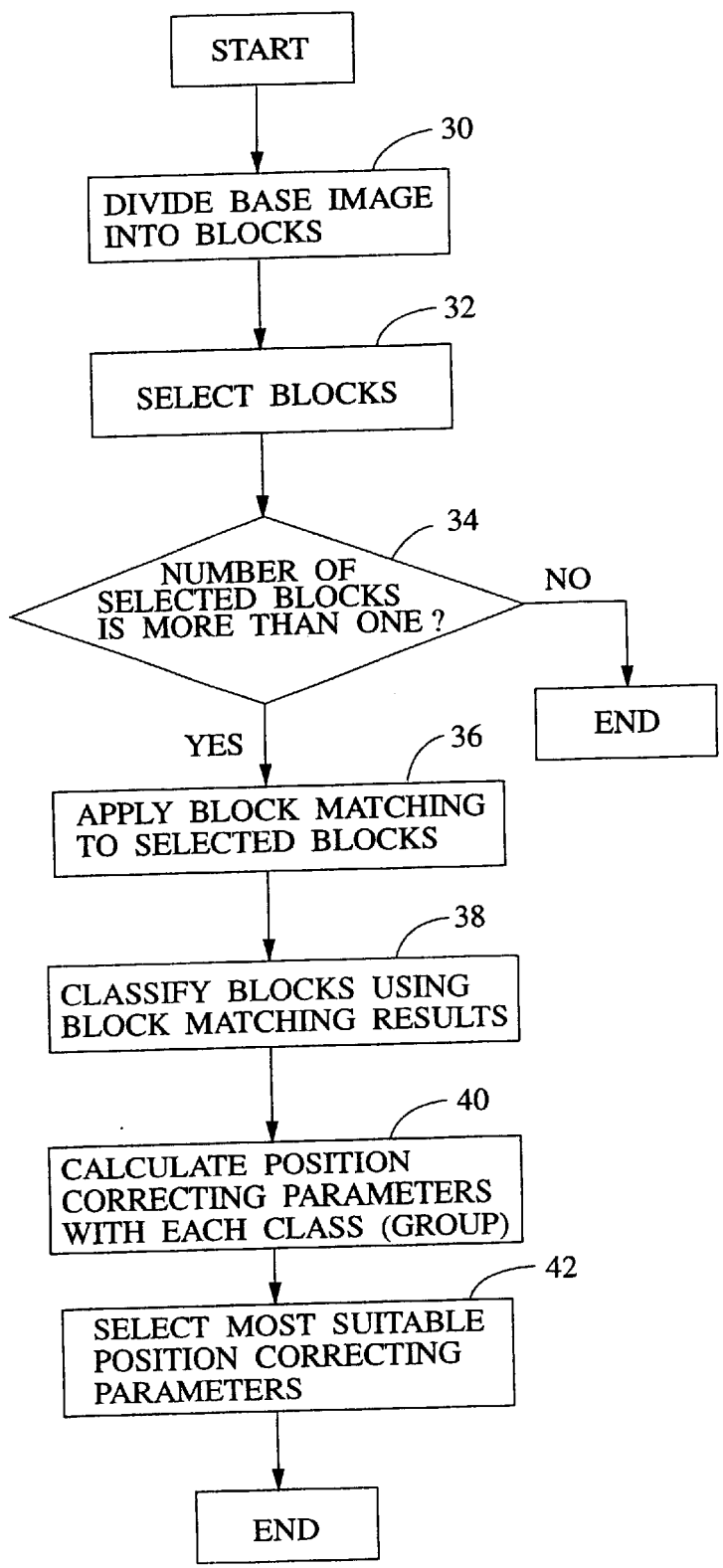
FIG. 2 is a flow chart which shows the steps which characterize the operation of the apparatus of FIG. 1.

FIG. 2 is a flow chart which shows the steps which characterize the operation of the apparatus 10. In the following, only a brief description of FIG. 2 is given, and the details thereof will become apparent as the description proceeds with reference to FIGS. 3 to 8.

In FIG. 2, at step 30, the base image stored in the memory 12 is divided into a plurality of blocks at the block divider 14. Subsequently, at step 32, the block selector 18 selects one or more blocks as mentioned above, and at step 34, a check is made to determine if the number of selected blocks is more than one. If the answer to the inquiry made at step 34 is negative, the routine is terminated, and otherwise (viz., YES) the routine proceeds to step 36 at which the block matching is applied, at the unit or portion 20, to the selected blocks. Further, at step 38, the blocks are classified, at the block classifier 22, into one or more groups on the basis of the block matching results. At step 40, the position correcting parameters are calculated with each group defined at step 38. Following this, at step 42, the most appropriate position correcting parameters are selected at the determiner 26.

Figure 3:
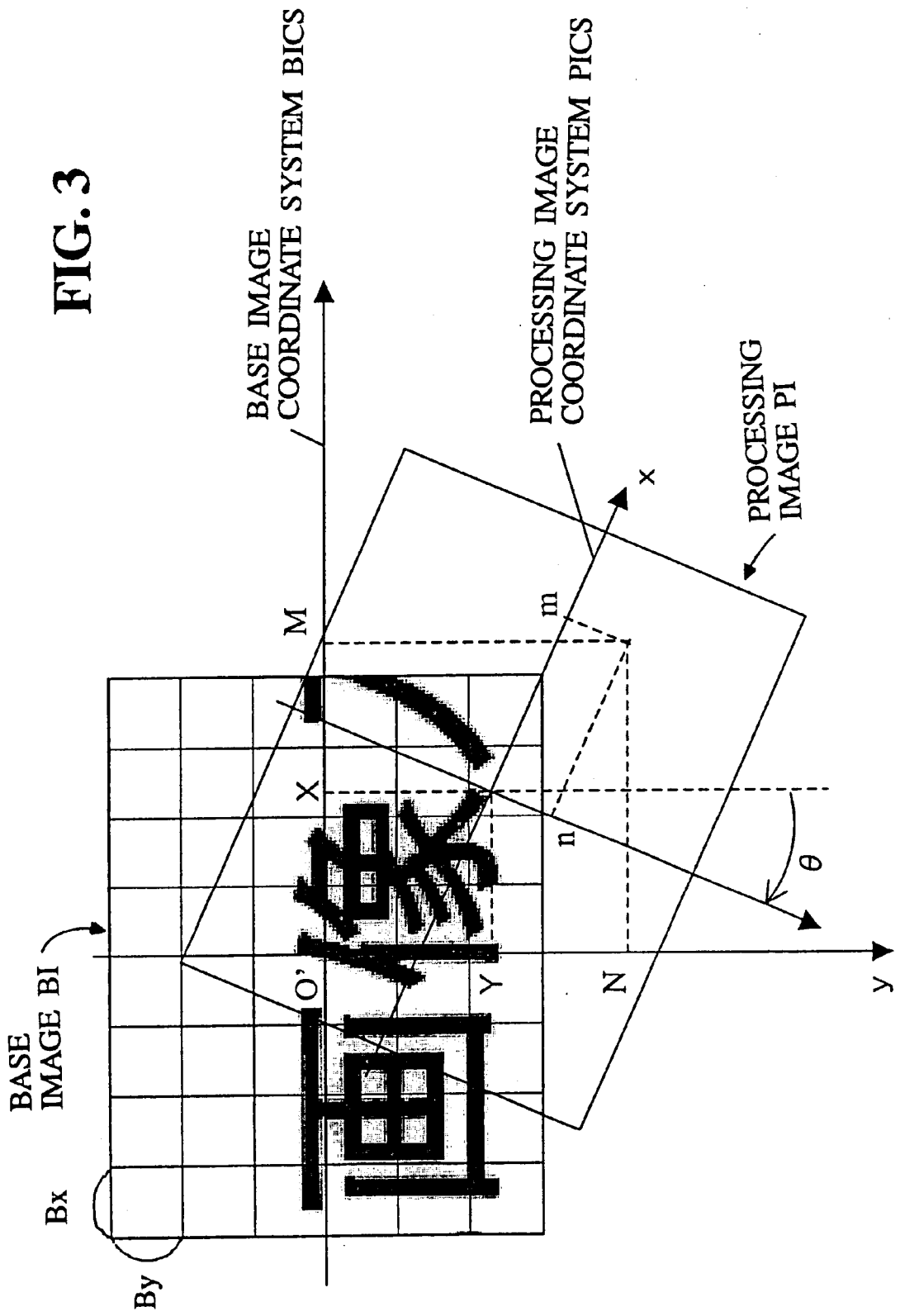
FIGS. 3 to 8 are each showing the operation of the apparatus of FIG. 1.

FIG. 3 is a diagram schematically showing a base image BI and a processing image PI to be matched to the base image BI. Assuming that the memory 28 (FIG. 1) has already stored data such as an initial location of the base image BI represented in a base image coordinate system BICS, a group of available position correcting parameter candidates, attributes of the base and processing images, etc. These data may be applied to the memory 28 from external via a communication line using the techniques which are disclosed in Japanese Laid-open Patent Application No. 9-218941 (Related Art 4) filed by the same entity as the assignee of the present application.

The processing image PI is initially located as illustrated in FIG. 3, wherein the initial position of the processing image PI is defined by coordinates X and Y, and a rotation angle θ in the base image coordinate system BICS. In this case, a position of the processing image PI in the base image coordinate system BSCS is given using the following homogeneous expression.

$$\begin{bmatrix} M \\ N \\ 1 \end{bmatrix} = \begin{bmatrix} \cos\theta & -\sin\theta & X \\ \sin\theta & \cos\theta & Y \\ 0 & 0 & 1 \end{bmatrix} \begin{bmatrix} m \\ n \\ 1 \end{bmatrix} \quad (1)$$

Assuming that only the variations of rotation and parallel movement (shift) exists between the base and processing images BI and PI and that there exists no magnification, reduction, and skew between the two images. Further, assuming that each size of the base and processing images BI and PI is defined by (Sx, Sy). These assumptions are presented merely for the sake of simplifying the disclosure and thus, the scope of the present invention is in no way restricted thereto. That is, the present invention is applicable to the case where the base image is represented in a way different to the above and where the variations between the two images involve the magnification and where and the sizes of the two images differ with each other.

Assuming that the each size of the blocks, divided by the block divider 14, has an identical size (Bx, By) as shown in FIG. 3. The data of each block are stored in the memory 16. Although the block size is determined in consideration of the size and contents of each of the base and processing images BI and PI, if the image size is in the range of about 320×240 pixels, it may be sufficient to divide the image into a plurality of blocks each having a size of 16×16 or 8×8 pixels. The divided blocks are sequentially numbered "i" ($1 \leq i \leq N$) for specifying each block (where N is the number of the whole blocks). The present invention is not restricted to the just-mentioned numbering of blocks on condition that the blocks are uniquely be ascertained.

Figure 4:
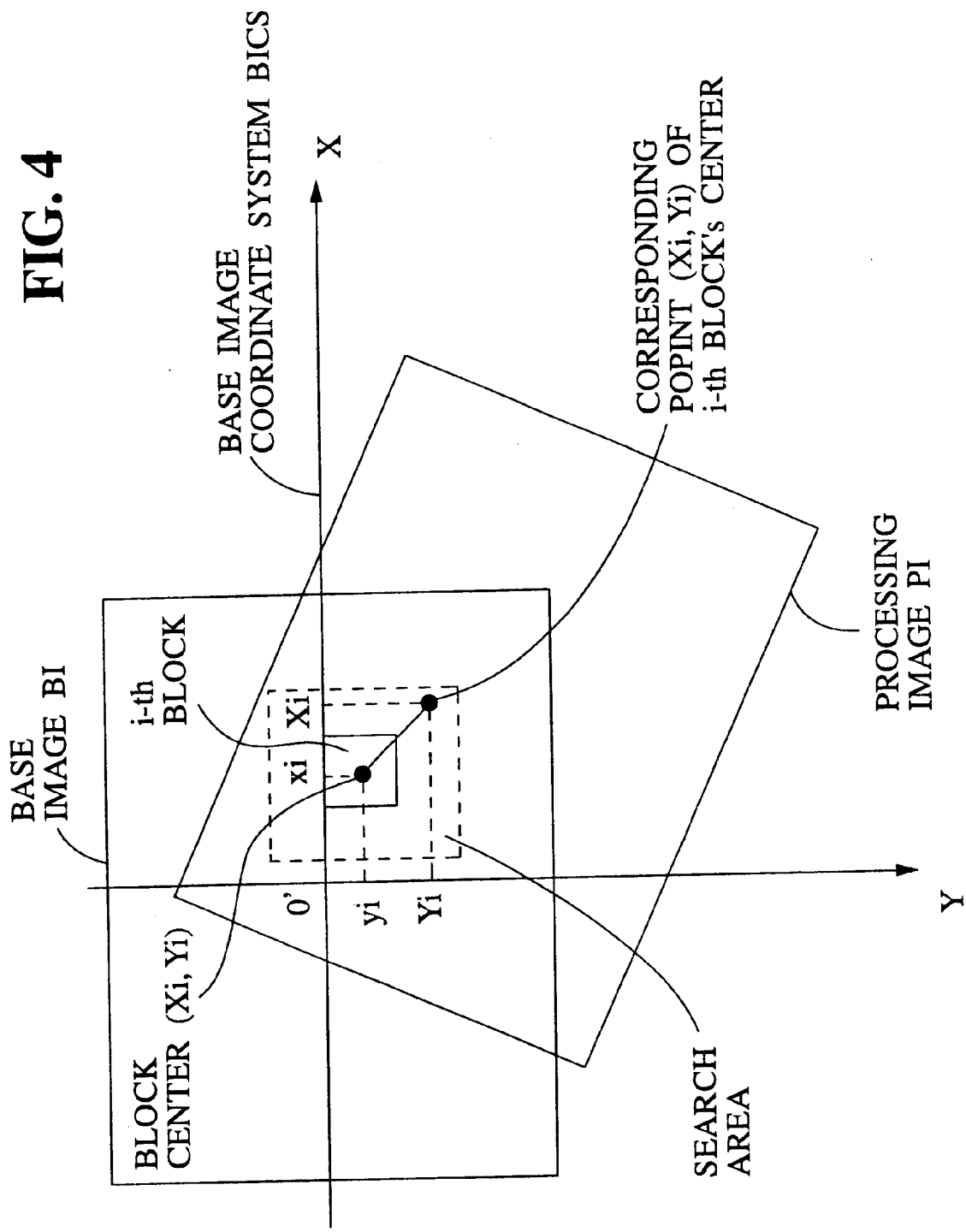

FIG. 4 shows an i-th block which forms part of the base image BI. The information of the i-th block involves a block center (xi, yi), a flag Fi ($1 \leq i \leq N$) indicating whether or not the block matching should be applied thereto, and a block group number Gi ($1 \leq i \leq N$) indicating the block classification results given by the block classifier 22. The flag Fi and the block group number Gi are typically stored in the memory 16. If the flag Fi is zero, no block matching is applied to the i-th block. It is possible to use only one indicator (index) instead of the two different indicators (viz., Fi and Gl). In this instance, if the indicator exhibits zero, no block matching is performed on the i-th block, and otherwise, the indicator teaches the corresponding block group number in the case of which the block matching is carried out on the i-th block. It is further possible to provide other information of the i-th block in addition to the above-mentioned block information. The block divider 14 determines the position parameters available for the i-th block among the position parameter candidates stored in the memory 28, and stores the position parameters determined to be available in the memory 16. As an alternative, it is possible to arrange the registration system in question in a manner that each block has identical position parameter candidates.

As mentioned above, the blocks, to which the block matching is to be applied, are selected by the block selector 18. The i-th block is selected for the block matching if the following two conditions are satisfied. The first condition is that the i-th block is located within an area shared by both the base and processing images at the initial positions thereof (viz., overlapped area of the two images). The second condition is that the possibility of inducing erroneous results is low when the block matching is implemented on the i-th block. Whether or not the second condition is satisfied is determined using a characteristic value particularly pertinent to the result of the block matching.

How to determine if a given block (viz., i-th block) is included in the overlapped area of the base and processing images BI and PI at the initial positions thereof is described.

A point (a,b) in the processing image coordinate system PICS is expressed by a point (a', b') in the base image coordinate system BICS. That is, $$a'=(a-X)\cdot\cos(-\theta)-(b-y)\cdot\sin(-\theta) \quad (2\text{-}1)$$

$$b' =(a-X)\cdot\sin(-\theta)+(b-y)\cdot\cos(-\theta) \quad (2\text{-}2)$$

On the other hand, the four corner positions of the i-th block in the base image coordinate system BICS is expressed by:

Upper left corner: (xi−Bx/2, yi−By/2)     (3-1)

Lower left corner: (xi−Bx/2, yi+By/2)     (3-2)

Lower right corner: (d+Bx/2, yi+By/2)     (3-3)

Upper right corner: (xi+Bx/2, yi−By/2)     (3-4)

If each point at the corners of the i-th block, which is expressed in the processing image coordinate system PICS using equation (2-1) and (2-2), is within the processing image PI, then the i-th block can be presumed to be located within the overlapping area.

It has been assumed, in the above, that each of the base and processing images BI and PI is rectangular, However, the present invention is also applicable, for example, to a masked image whose shape is not rectangular or square. In this case, a check is made to determine if each point at the corners of the i-th block, which is expressed in the processing image coordinate system PICS, is in the processing image PI by referring to the masked image.

There will be described, with reference to FIG. 5, how to determine the possibility that leads to the erroneous results when the block matching is implemented.

In the instant embodiment, a threshold, via which the above-mentioned possibility in connection with a given block (viz., i-th block) is determined, makes use of the distribution of pixel values in the i-th block. In the case where the pixel value distribution within the i-th block is less than the threshold, it is determined that if the block matching is implemented on the i-th block, the block matching results may be erroneous.

Figure 5:
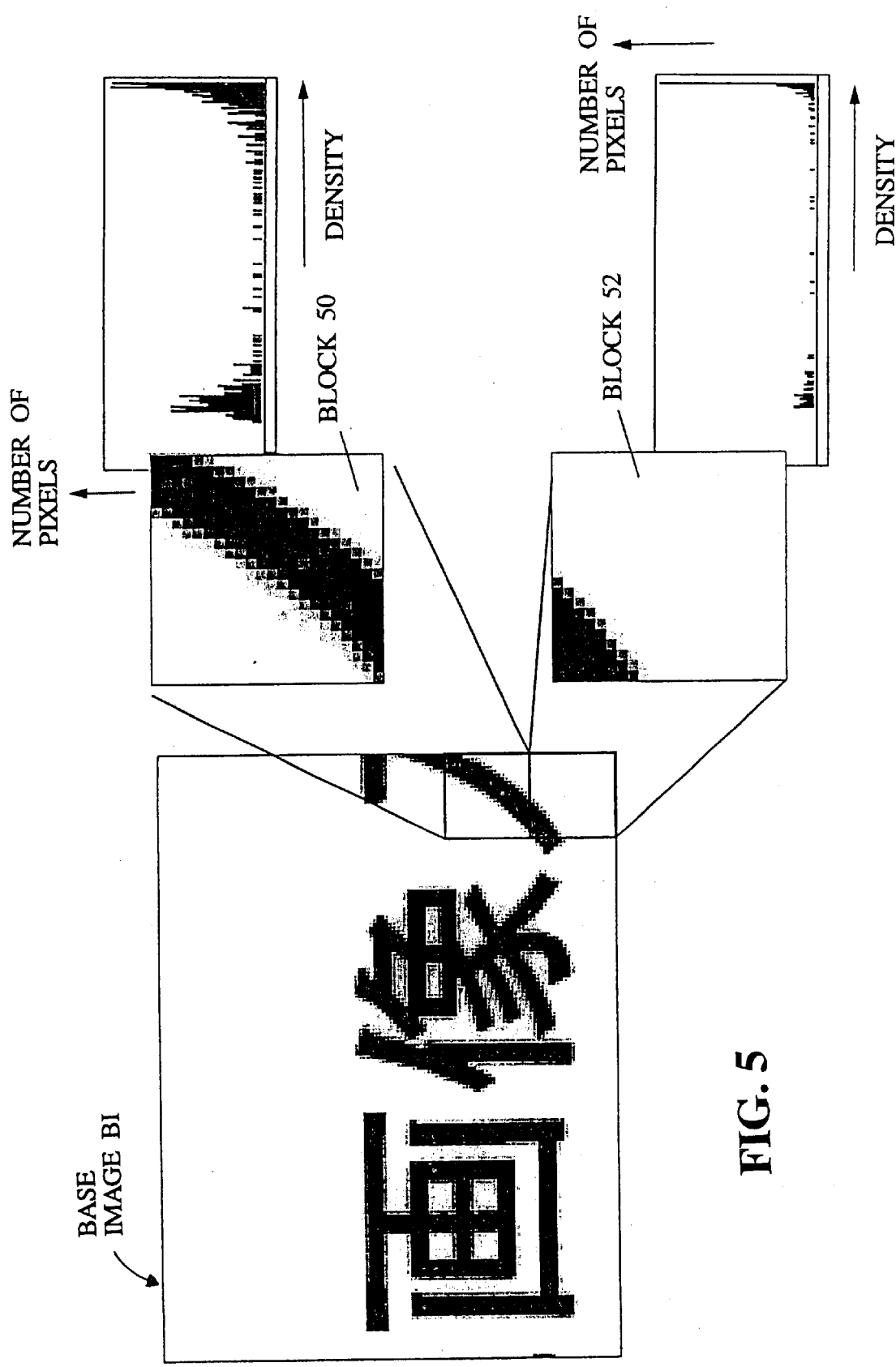

As shown in FIG. 5, two density histograms of respective blocks 50 and 52, both forming part of the base image BI are shown. Especially, the density histogram of the block 52 depicts that the pixel values concentrate in a narrow range of density, That is, the block 52 is provided with a small number of pixels available for block matching. Accordingly, it is supposed very difficult to produce good results when the block matching is implemented on the block 52, and thus, the block 52 is not selected by the block selector 18. It is to be noted that another block characteristic values can be used instead of the above-mentioned pixel value distribution of the block. For example, although the base image BI is a gray-scale image in the instant embodiment, the present invention is also applicable to a binary image wherein the proportion of black pixels in each block can be used for determining the threshold. Further, in order to determine the threshold, more complicate characteristic values are available, which, for example, are disclosed in a paper entitled "A Reliability Metric for Motion Vectors in Moving Pictures and its Application" by Toshiyuki YOSHIDA, et. al., released from Japanese Association of Electronics, Information, and Communication, D-II, Vol. J80-D-II, No.5, pp. 1192–1201, May 1997 (Related Art 5).

Figure 6:
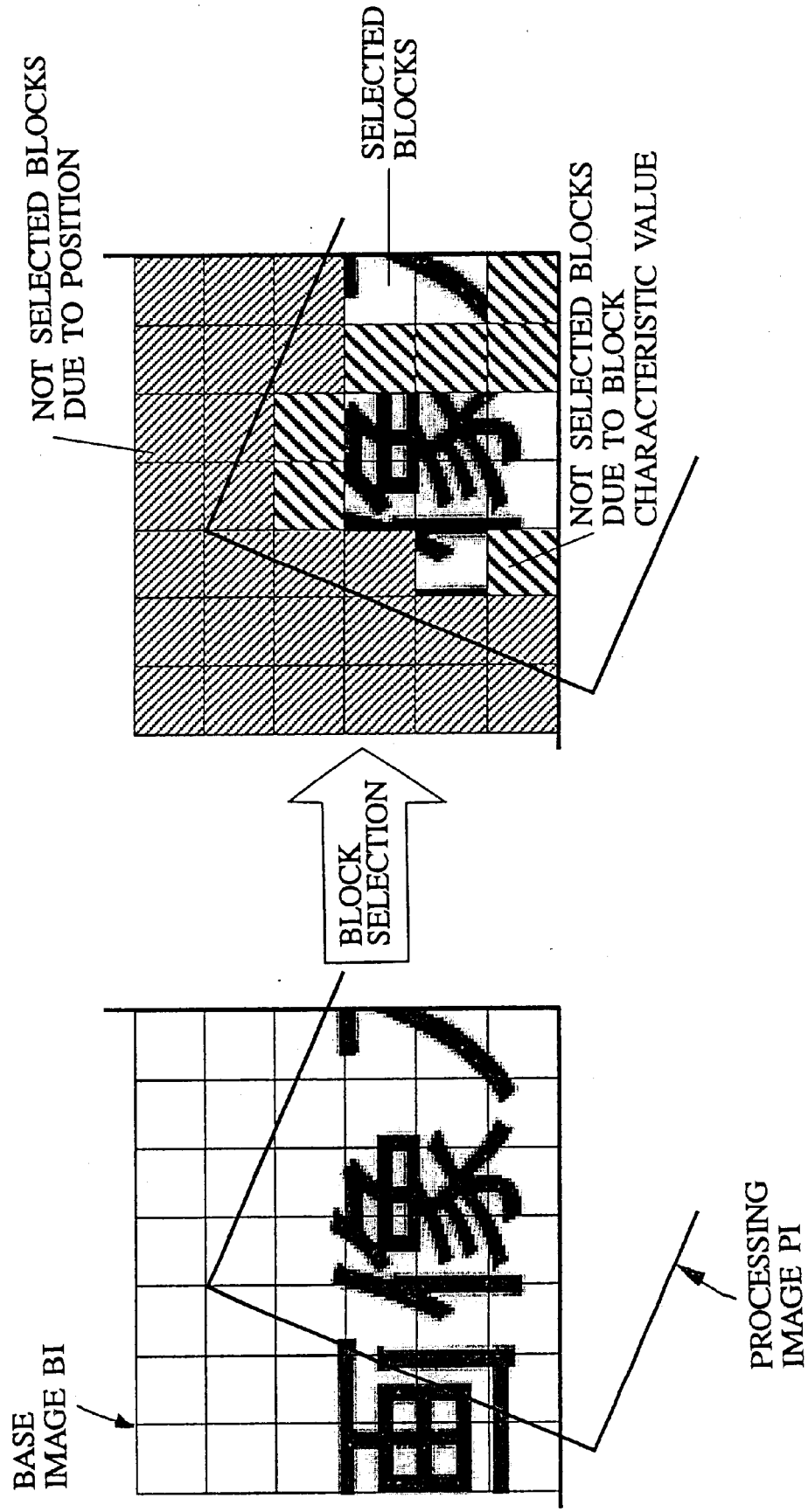

FIG. 6 shows an example of block selection results generated from the block selector 12. The finely hatched blocks are not selected due to the locations thereof in the base image BI, and the coarsely hatched blocks are also not selected because the corresponding block characteristic value is less than the threshold. On the other hand, no hatched blocks are selected, on which the block matching shall be implemented.

To iterate, all the blocks, each of which satisfies the following two conditions, are selected at the block selector 18. As mentioned above, the first condition is that the block is located within an area shared by both the two images BI and PI at the initial positions thereof. The second condition is that the possibility of inducing erroneous result(s) is low when the block matching is implemented on the block. However, it is not necessary to select all the blocks that satisfy the first and second conditions at the same time. As an alternative, it is possible to select the blocks of the base image BI in order of higher block characteristic values until reaching the predetermined number of blocks. In this instance, since the number of blocks, on which the block matching is implemented, is limited, it is able to effectively reduce the amount of image processing steps thereby to markedly reduce the data processing time.

If the number of blocks selected by the block selector 18 is two or more than two (step 34 of FIG. 2), the selected blocks are subject to the block matching at the following step 36.

On the contrary, if the number of blocks selected by the block selector 18 does not reach two (2) (step 34 of FIG. 2), the registration process is terminated in that it is unable to determine the parameters including rotation during the block matching. In this case, in stead of simply terminating the registration process as mentioned above, another technique for determining the position correcting parameters may be available. That is, the position correcting parameters are determined using a known process such as successive search of parameter space formed by all the position correcting parameter candidates. However, the successive search of the parameter space is preferably applied to the present invention only if the image registration according to the present embodiment is not applicable as mentioned above. Therefore, if the registration processes should be implemented on a large number of image pairs, it is able to increase efficiency of image processing rather than a known straightforward use wherein the successive search of the parameter space is only performed.

Returning to FIG. 4, the block matching according to the instant embodiment will further be described (step 36 of FIG. 2).

The block matching section 20 (FIG. 1) operates such as to specify the position corresponding to the i-th block of the base image BI in the processing image coordinate system PICS. In order to specify the above-mentioned block position, the block matching section 20 determines the component of required parallel movement of the processing image PI for image matching by referring to the memory 16 which has stored the position parameter candidates determined by the block divider 14. Further, the block matching section 20 sets a search area which specifies the movable area of the i-th block. Thereafter, the center position (xi, yi) of the i-th block is shifted (moved) within the search area so as to determine the point that exhibits the highest similarity measure by way of evaluating the degree of the overlapping of the i-th block and the processing image PI. The position thus determined may be considered to provide the most likeness between the i-th block and the processing image PI. This image process is well known in the art as template matching, which is disclosed, for example, in the aforesaid Related ART 1, Japanese book entitled "Image Process Handbook" published by Shokodo, pp. 303–305 (Related Art 6), or Japanese book entitled "Image Analysis Handbook" published by Publish Section of University of Tokyo, pp. 707–748 (Related Art 7). Accordingly, the details of the template matching will not be given for the sake of simplifying the instant disclosure. In the case where the image registration is applied to a complicatedly shaped image obtained using a masked image or a rotated image, the portion of the processing image PI, which corresponds to the i-th block, is liable to become nonrectangular at the periphery. However, this problem is able to be overcome by using registration techniques disclosed in Japanese Laid-open Patent Application No. 9-56060 (Related Art 8) filed by the same entity as the present application.

In the following description, assuming that after having implemented the block matching (step 38 of FIG. 2), it has been determined that the block center (xi, yi) of the i-th block corresponds to the position (Xi, Yi) of the processing image PI (FIG. 4).

As mentioned above, according to the present invention, the blocks, each of which may lead to erroneous results upon the block matching being performed thereon, are not selected for the block matching. However, there is the possibility that the block matching is not correctly implemented even on the blocks selected by the block selector 18 due to errors induced during the image processing or unexpected image characteristics. In order to address this difficulty, according to the present invention, the block matching results are examined and classified into a plurality of groups wherein the results, which are apt to produce identical position correcting parameters, are categorized into the same group (step 38 of FIG. 2). This means that the blocks are also simultaneously classified in the block groups in accordance with the block matching result group. Subsequently, the position correcting parameters are determined with each group at the parameter calculator 24 (see FIG. 1 and step 40 of FIG. 2).

Figure 7B:
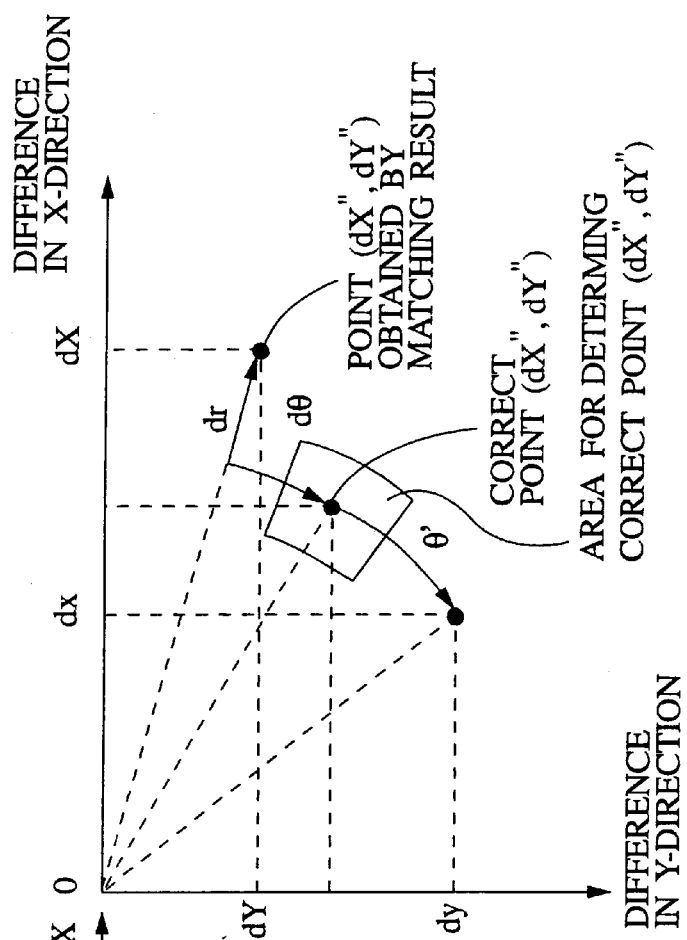
Figure 7A:
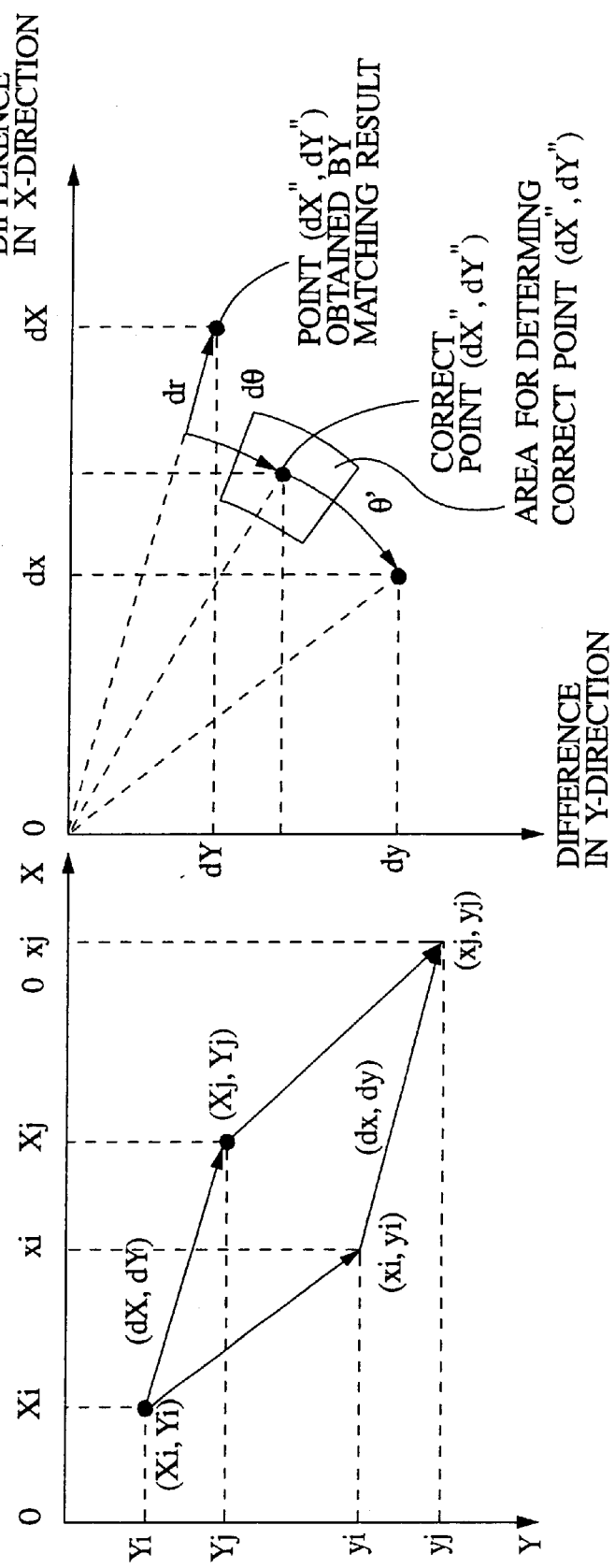

FIG. 7A is a diagram for describing the manner of classifying the blocks (or block matching results). In FIG. 7A, the points (xi, yi) and (xj, yj) are respectively indicative of the center points of blocks i and j (neither shown). It is to be noted that the classifying of blocks are successively carried out with all the pairs of the blocks of the base image BI. The points (Xi, Yi) and (Xj, Yj), respectively represent the center points of the blocks i and j on the processing image PI. Still further, the vector extending from the block i to the block j is represented by (dx, dy). The vector extending from the point, which corresponds to the block i on the processing image PI, to the point, which corresponds to the block j on the processing image PI, is represented by (dx, dy). The position correcting parameters for most preferably matching the processing image PI and the base image BI are written as follows using homogeneous expression:

$$\begin{bmatrix} \cos\theta' & -\sin\theta' & X' \\ \sin\theta' & \cos\theta' & Y' \\ 0 & 0 & 1 \end{bmatrix} \tag{4}$$

where $\theta'$ denotes the amount of rotation, and (X', Y') denotes the amount of parallel movements.

In the case where the blocks i and j and the matching results thereof follow the above expression, the transformation of the point (corresponding to the block i and on the processing image PI) to the block i, is given by $$\begin{bmatrix} x_i \\ y_i \end{bmatrix} = \begin{bmatrix} \cos\theta' & -\sin\theta' \\ \sin\theta' & \cos\theta' \end{bmatrix} \begin{bmatrix} X_i \\ Y_i \end{bmatrix} + \begin{bmatrix} X' \\ Y' \end{bmatrix} \tag{5}$$

Further, the transformation from the point (corresponding to the block j and on the object image PI) to the block j, is given by $$\begin{bmatrix} x_j \\ y_j \end{bmatrix} = \begin{bmatrix} \cos\theta' & -\sin\theta' \\ \sin\theta' & \cos\theta' \end{bmatrix} \begin{bmatrix} X_j \\ Y_j \end{bmatrix} + \begin{bmatrix} X' \\ Y' \end{bmatrix} \tag{6}$$

The vector (dx, dy) between the points (xi, yi) and (xj, yj) is written by $$\begin{bmatrix} dx \\ dy \end{bmatrix} = \begin{bmatrix} x_j \\ y_j \end{bmatrix} - \begin{bmatrix} x_i \\ y_i \end{bmatrix} = \begin{bmatrix} \cos\theta' & -\sin\theta' \\ \sin\theta' & \cos\theta' \end{bmatrix} \begin{bmatrix} X_j - X_i \\ Y_j - Y_i \end{bmatrix} = \begin{bmatrix} \cos\theta' & -\sin\theta' \\ \sin\theta' & \cos\theta' \end{bmatrix} \begin{bmatrix} dX \\ dY \end{bmatrix} \tag{7}$$

It is understood that if the same transformation is applied to the blocks i and j, the points (dx", dy") and (dX", dY") corresponding to the respective vectors (dx, dy) and (dX, dY) are located away from each other by the amount of rotation $\theta'$ on the same circumference of a circle in the plane whose axes are the difference between the blocks i and j along the x and y directions, as shown in FIG. 7(B). If the available range of the amount of rotation $\theta'$ and an allowable distance error (denoted by dr) can be limited, the locatable area of the point (dX", dY") against the point (dx", dy") is also able to be limited. Therefore, whether or not the result obtained by the block matching on the blocks i and j is based on the same transformation, is determined by checking if the point (dX", dY").

The region within which the amount of rotation $\theta'$, is allowed to exist is given by the position correcting parameters stored in the memory 28. The rotation $\theta'$ is presumed to take a value within the following range whose center is zero (0).

$$-\Delta\theta \leq \theta' \leq \Delta\theta \ (\Delta\cdot\theta \geq 0) \tag{8}$$

Further, assuming that the allowable range of the difference (denoted by "d") between the two distances, one of which is from the origin to the point (dX", dy") and the other is from the origin to the point (dX", dY"), is written by:

$$-\Delta r \leq d \leq \Delta r (\Delta r \geq 0) \tag{9}$$

This assumption is made merely for the convenience of describing the present embodiment, and actually the allowable range as mentioned above is determined depending on the images to which the present invention is applied. In this case, the angle d$\theta$ between the points (dx", dy") and (dX", dY") and the difference dr between the two distances are given by $$d\theta = \tan^{-1}\left[\frac{dY}{dX}\right] - \tan^{-1}\left[\frac{dy}{dx}\right] \tag{10}$$

$$dr = \sqrt{dX^2 + dY^2} - \sqrt{dx^2 + dy^2}$$

If the values d$\theta$ and dr satisfy respectively the following equations, the results of implementing the block matching on the blocks i and j are considered to be in the same group.

$$-\Delta\theta \leq d\theta \leq \Delta\theta \ (\Delta\theta \geq 0) \tag{11}$$

$$-\Delta r \leq dr \leq \Delta r (\Delta r \geq 0) \tag{12}$$

All the blocks selected are classified into a plurality of groups by applying the above processes to all the combinations of two selected blocks. In connection with the blocks belonging to the same group, the same value is given to the group number Gi of the block attributes stored in the memory 16. Thus, the block matching results are classified into the groups each providing the identical position correcting parameters. In other words, each of the blocks, which have not been grouped, indicates the block matching result apparently different from the grouped blocks. More specifically, it is conceivable that the block, which has not been grouped, has generated the erroneous matching result that fails to correctly reflect the transformation of the actual image and/or that is caused by errors during the block matching. It is thus possible to increase the accuracy of the position correcting parameters calculated for each group by way of classifying the blocks into a plurality of groups each of which provides the identical position correcting parameters.

Figure 8A:
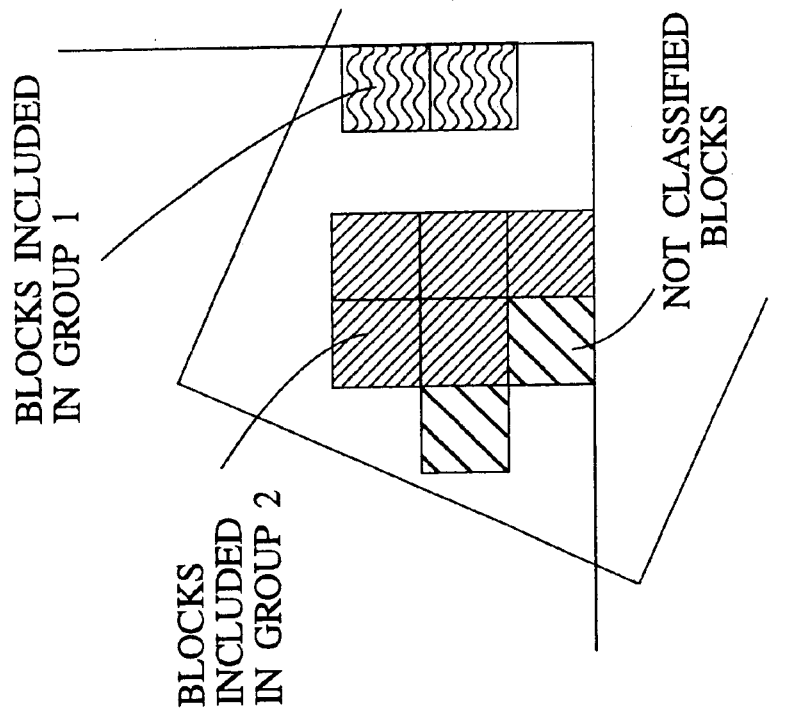
Figure 8B:
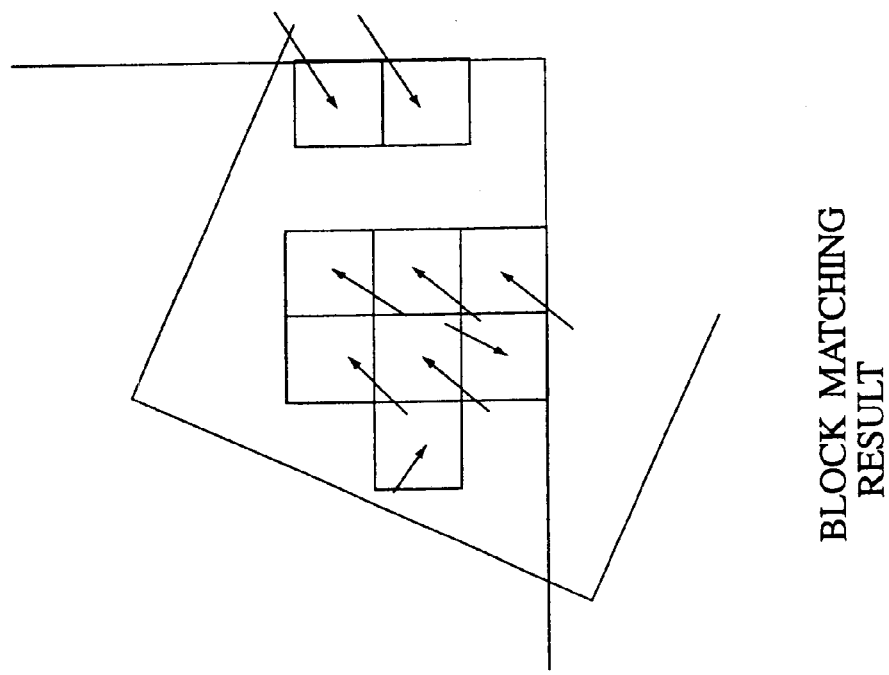

FIG. 8A shows schematically the results of the block matching, while FIG. 8B illustrates the three groups of blocks, the two groups of which have been classified into two groups (denoted by 1 and 2) and the remaining group of which has not been classified into no group.

Returning to FIGS. 7A and 7B, the similarity of the blocks i and j is determined using the two-stage processes: (1) if dθ is included within the predetermined range and (2) if dr is included within the predetermined range. However, it is possible to determine the similarity of the blocks i and j using the evaluation function set forth below.

$$S(d\theta, dr) = e^{-\left[\frac{d\theta^2 \log_e 0.9}{\Delta \theta^2} - \frac{dr^2 \log_e 0.9}{\Delta r^2}\right]} \quad (13)$$

More specifically, if the values obtained using the above evaluation function exceeds a threshold value, it is determined that the block matching result of the blocks i and j is produced by the identical position correcting parameters. Although it is required to determine the evaluation function and the threshold considering the image characteristics, the determination of similarity of two blocks located in the boundary region of their existing area can advantageously be implemented more easily (or more flexibly) compared with the above-mentioned techniques using the two-stage processes.

The position correcting parameter calculator 24 produces, using the least squares method, the parameters for compensating the position of the processing image PI in connection with each of the block groups thus determined (step 40 of FIG. 2).

In the case where the position correcting parameters of the processing image PI is expressed as in Equation (4), the values θ', X', and Y' are determined which minimizes the sum of the square of the differences, each of which is given by the following equation (14), in connection with the blocks in the same group.

$$\begin{bmatrix} e_{x_i} \\ e_{y_i} \end{bmatrix} = \begin{bmatrix} x_i \\ y_i \end{bmatrix} - \left[\begin{bmatrix} \cos\theta' & -\sin\theta' \\ \sin\theta' & \cos\theta' \end{bmatrix}\begin{bmatrix} X_i \\ Y_i \end{bmatrix} + \begin{bmatrix} X' \\ Y' \end{bmatrix}\right] \quad (14)$$

More specifically, equation (14) represents the difference between the position compensated by the corresponding position correcting parameters (XI, YI) of the I-th block in the processing image PI and the position (xI, yI) of the i-th block.

The values θ', X', and Y' are determined which satisfy the following equation.

$$\min_{\theta', X', Y'}\{E\} = \min_{\theta', X', Y'}\left\{\sum_{I \in \text{same group}}(e_{x_i}^2 + e_{y_i}^2)\right\} \quad (15)$$

This is determined by solving the simultaneous equation set forth below.

$$\frac{\delta E}{\delta \theta'} = \frac{\delta E}{\delta X'} = \frac{\delta E}{\delta Y'} = 0 \quad (16)$$

thus, $$\theta' = -\tan^{-1}\left\{\frac{\Sigma x_i \cdot Y_i - \Sigma y_i \cdot X_i - \frac{1}{K}\Sigma x_i \Sigma Y_i - \frac{1}{K}\Sigma y_i \Sigma X_i}{\Sigma x_i \cdot X_i + \Sigma y_i \cdot Y_i - \frac{1}{K}\Sigma x_i \Sigma X_i - \frac{1}{K}\Sigma y_i \Sigma Y_i}\right\} \quad (17)$$

$$X' = \frac{1}{K}\{\Sigma x_i - \cos\theta' \cdot \Sigma X_i + \sin\theta' \cdot \Sigma Y_i\}$$

-continued
$$Y' = \frac{1}{K}\{\Sigma y_i - \sin\theta' \cdot \Sigma X_i - \cos\theta' \cdot \Sigma Y_i\}$$

where Σ denotes the sum of the blocks all included in the same group, and K denotes the number of blocks in the same group.

The position correcting parameters thus determined are stored in the location parameter memory 28. The position correcting parameters indicate the transformation from the initial position of the processing image PI in the base image coordinate system BICS. Thus, the new position of the processing image PI in the base image coordinate system BICS is determined by the following multiplication.

$$\begin{bmatrix} \cos\theta' & -\sin\theta' & X' \\ \sin\theta' & \cos\theta' & Y' \\ 0 & 0 & 1 \end{bmatrix}\begin{bmatrix} \cos\theta & -\sin\theta & X \\ \sin\theta & \cos\theta & Y \\ 0 & 0 & 1 \end{bmatrix} \quad (18)$$

The first term of expression (18) is identical to the homogeneous expression (5)

The most suitable position correcting parameter determiner 26 retrieves, from the memory 28, a plurality of position correcting parameters and determines the parameters for most suitably matching the processing image PI to the base image BI (step 42 of FIG. 2). That is, the parameter determiner 28 sequentially applies the position correcting parameters to the initial position of the processing image PI and evaluates the similarity of overlapped portion of the two images BI and PI when moving the processing image PI. This process is to perform the image registration by way of the successive search wherein the position correcting parameters stored in the memory 28 are used as parameter candidates, and is implemented using conventional techniques. One example of such known techniques is disclosed in Japanese Laid-open Patent Application No. 9-56060 (aforesaid Related Art 8) filed by the same entity as the assignee of the present application.

Thus, the position correcting parameters, determined by the parameter determiner 26, indicate the movement of the processing image PI to the most proper position for merging the same to the base image BI, and are considered as the block matching results between the two images.

In the above descriptions, the sizes of the blocks of the base image BI are made equal with one another. However, as an alternative, it is possible to extract the edge (viz., part of periphery) of the image which provides a distinctive feature point(s) for image matching. Thereafter, the image portion in the vicinity of the feature point is divided into a plurality of blocks. In other words, this process simultaneously performs the two-stage processes of the block divider 14 and the block selector 18. The subsequent image processing operations are identical with those as mentioned above. It is to be noted that even if the just-mentioned process is used, the feature of the present invention is able to effectively be retained.

It will be understood that the above disclosure is representative of only one possible embodiment of the present invention and that the concept on which the invention is based is not specifically limited thereto.

What is claimed is:

1. An apparatus for performing computer-implemented image registration of first and second 2-dimensional images using block matching wherein said first image is divided into a plurality of blocks, comprising:
   first means for classifying said plurality of blocks into a plurality of block groups, using block matching results, such that ones of said plurality of blocks classified into a same block group produce similar position correcting parameters for correcting registration of the first and second 2-dimensional images relative to a 2-dimensional coordinate system;

second means for determining a plurality of position correcting parameters for each of said plurality of block groups determined by said first means;

third means for determining optimal position correcting parameters, among said plurality of position correction parameters determined by said second means, by referring to said first and second 2-dimensional images;

a block selector for selecting ones of said plurality of blocks, each of said ones of said plurality of blocks being selected based on a low probability of causing an erroneous result when the block matching is implemented on said each of said ones of said plurality of blocks; and block matching means for implementing the block matching on said each of said ones of said plurality of blocks.

2. An apparatus for determining positional relationship between first and second images in order to implement registration of said first and second images, comprising:

a first memory;

a block divider for dividing said first image into a plurality of blocks and determining attribute data for each of said plurality of blocks which is stored in said first memory;

a block selector for determining block characteristic values for each of said plurality of blocks by referring to said first image and said attribute data stored in said first memory, said block selector selecting, using said block characteristic values, ones of said plurality of blocks, each of said ones of said plurality of blocks being selected based on a low probability of causing an erroneous result when block matching is implemented on said ones of said plurality of blocks;

block matching means for implementing the block matching on said ones of said plurality of blocks and determining corresponding points of said first and second images, said corresponding points being stored in said first memory;

a block classifier for classifying said plurality of blocks into a plurality of block groups, using block matching results, such that blocks classified into a same block group produce similar position correcting parameters;

a second memory:

means for determining position correcting parameters for each of said plurality of block groups, said position correcting parameters being stored in said second memory; and a parameter determiner for determining a position correcting parameter, among said position correction parameters, for optimally matching said first and second images.

3. The apparatus claimed in claim 2, wherein said third means determines said position correcting parameters by referring to said first and second images.

4. A method of performing computer-implemented image registration of first and second 2-dimensional images using block matching wherein said first image is divided into a plurality of blocks, comprising the steps of:

(a) classifying said plurality of blocks into a plurality of block groups, using block matching results, such that blocks classified into a same block group produce similar position correcting parameters for Correcting registration of the first and second 2-dimensional images relative to a 2-dimensional coordinate system;

(b) determining a plurality of position correcting parameters for each of said plurality of block groups determined by said first means; and (c) determining optimal position correcting parameters, among said plurality of position correction parameters determined by said second means, by referring to said first and second 2-dimensional images;

selecting ones of said plurality of blocks, each of said ones of said plurality of blocks being selected based on a low probability of causing an erroneous result when the block matching is implemented on said each of said ones of said plurality of blocks; and implementing the block matching on the selected ones of said plurality of blocks.

5. A method of determining positional relationship between first and second images in order to register said first and second images, comprising the steps of:

(a) dividing said first image into a plurality of blocks and determining attribute data of each of said plurality of blocks which is stored in a first memory;

(b) determining block characteristic values of each of said plurality of blocks by referring to said first image and said attribute data stored in said first memory, and selecting, using said block characteristic values, ones of said plurality of blocks, each of said ones of said plurality of blocks being selected based on a low probability of causing an erroneous result when block matching is implemented on said ones of said plurality of blocks;

(c) implementing the block matching on the selected ones of said plurality of blocks and determining corresponding points of said first and second images, said corresponding points being stored in said first memory;

(d) classifying said plurality of blocks into a plurality of block groups, using block matching results, such that blocks classified into a same block group produce similar position correcting parameters;

(e) determining position correcting parameters for each of said plurality of block groups, said position correcting parameters being stored in a second memory; and (f) determining a position correcting parameter, among said position correction parameters stored in said second memory, for optimally matching said first and second images.

\* \* \* \* \*